June 29, 1965 NAOYUKI OHARA 3,191,514
LENS SHUTTER FOR SINGLE-LENS REFLEX CAMERA
Filed June 24, 1963 11 Sheets-Sheet 2

United States Patent Office 3,191,514
Patented June 29, 1965

3,191,514
LENS SHUTTER FOR SINGLE-LENS
REFLEX CAMERA
Naoyuki Ohara, 436 1-chome, Soshigaya,
Setagaya-ku, Tokyo-to, Japan
Filed June 24, 1963, Ser. No. 289,880
Claims priority, application Japan, Mar. 21, 1959,
34/9,018; May 8, 1959, 34/24,996; Sept. 16, 1959,
34/29,145
3 Claims. (Cl. 95—42)

This application is a continuation-in-part of prior application Serial No. 15,863, filed on March 18, 1960, in the name of Naoyuki Ohara, now abandoned, and entitled "Lens Shutter For Single-Lens Reflex Camera."

The present invention relates to photographic lens shutters, and more particularly it relates to a new and improved lens shutter for single-lens reflex camera, having an auxiliary opening and closing device which, independently of sequence before or after the fundamental exposure function of the shutter, opens the shutter blades. In a shutter of this kind, it is necessary that the cocking of the main operating member becomes possible when the shutter blade ring is in its position for opening the shutter blades, and that the shutter blades can be opened after completion of the exposure operation. It is also necessary that the timing of the opening of the shutter blades is made to be precise.

It is an object of the present invention to provide a new and improved lens shutter, of comparatively simple but durable construction, for single-lens reflex cameras, which completely satisfies the above-stated requirements.

Said object and other objects and advantages which will become apparent hereinafter have been achieved by the lens shutter of this invention, wherein by cocking the main operating member and releasing the shutter blades from the opened condition, the shutter blades are first closed; the aperture diaphragm blades are automatically stopped down to the required aperture setting; after which the mirror and film cover plate are raised; then, upon thorough completion of these actions, the main operating member of the shutter is released to be adapted to the primary, exposure operation of the shutter; and after this, the mirror and film cover plate are lowered again, and the shutter blades are opened for adjustment of focus. In order to make the above-described actions of the shutter blades and motions of the mirror and film cover plate precise, the shutter of the present invention incorporates a signal generating device which signals the instant of the time at which the exposure operation is completed to the exterior of the shutter. This signalling action is effected by a mechanism wherein the main operating member actuates a signal lever when the exposure operation is completed.

Accordingly, it is a unique feature of the shutter of this invention that, regardless of the length of the exposure time, the completion of the exposure operation is signalled to the outside.

The novel features which are considered as characteristic for the invention are set forth in particular in the appended claims. The invention itself, however, both as to its construction and its method of operation, together with additional objects and advantages thereof, will be best understood from the following detailed description of this specific embodiment when read in connection with the accompanying drawings, in which the same or equivalent members are designated by the same numerals, and in which:

FIGS. 15, 16, 17 and 18 are partial, front elevational views, showing the elements for connecting the main operating member and the shutter blade ring and actions of said elements, for describing the mechanism for causing the shutter blade to be always opened irrespective of the sequence before or after the cocking of the main operating member.

FIGS. 20, 21 and 22 are partial, front elevational views for describing the release lever mechanism.

Figure 1:
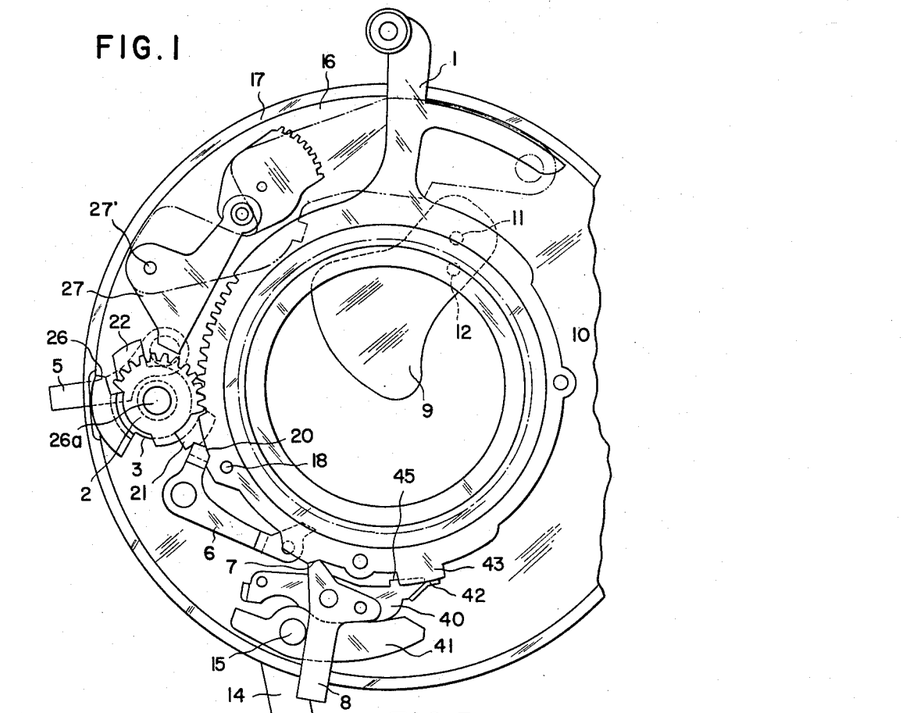
FIG. 1 is a front elevational view, as viewed in the direction of the optical axis, with parts cut away and with some parts deleted for simplification, showing certain internal elements of one embodiment of the shutter of the present invention.
Figure 2A:
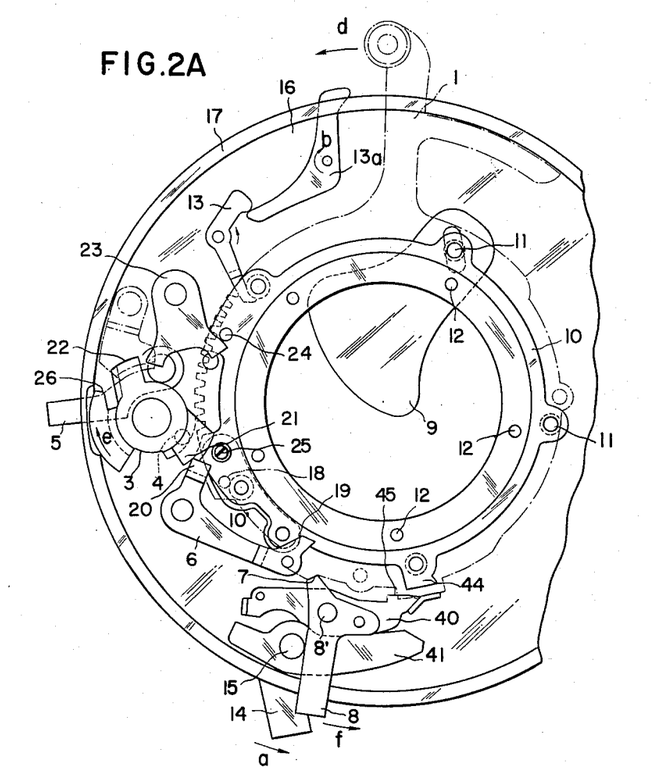
FIG. 2A is a front elevational view, similar to FIG. 1, showing some additional, internal elements of the embodiment.

Referring particularly to FIGS. 1 and 2A, the mechanism comprises a shutter plate 16, a shutter case 17, a cocking member 1, a cocking pinion 2, and a main operating member 3 which has the power source for the primary operation of exposure of the shutter. A pin 4 which is embedded at its root in the said main operating member 3 engages with a signal lever 5 (in FIG. 5), and the main operating member 3 is caught by the main operating member hooking lever 6. On one hand, the cocking member 1 is held to a second release lever 8 by a protruding arm 7. A plurality of shutter blades 9 are rotated by a plurality of blade pins 11, which are embedded at their roots in a shutter blade ring 10, and accomplish exposure operation by undergoing pivotal motion, each of said blades 9 being pivoted at a fixed pin 12 as a pivot.

Figure 2B:
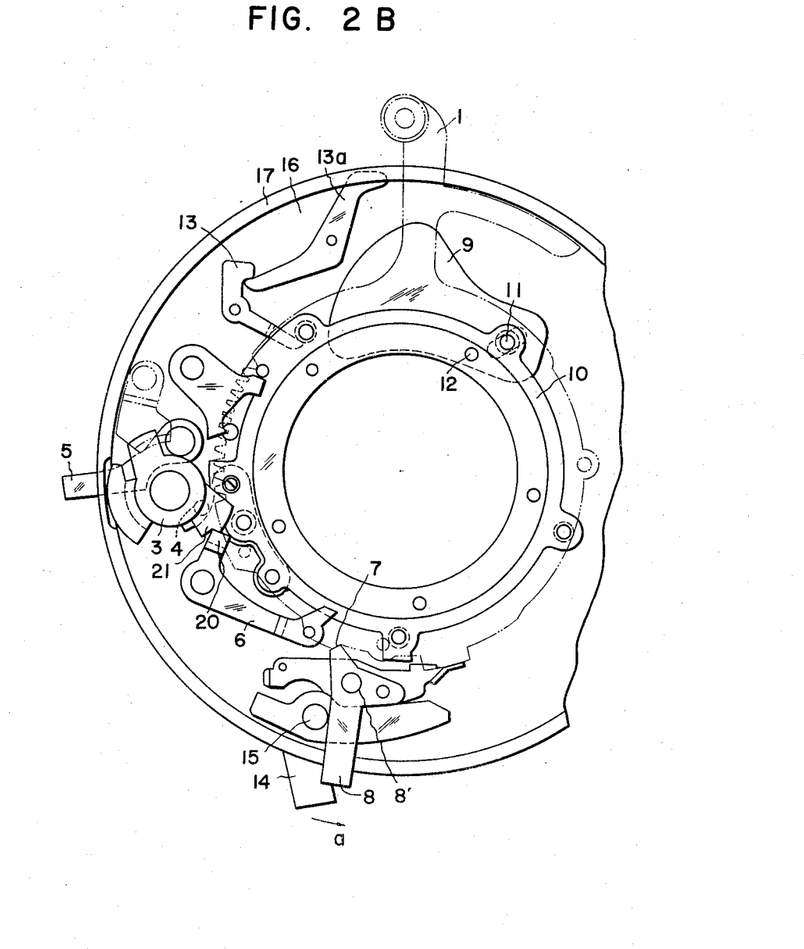
FIGS. 2B, 2C and 2D are similar to FIG. 2 but show different positions of the elements of the device.

In the cocked state the shutter takes the position as shown in FIG. 2B. In this state the main operating member 3 stores a strong torque force of clockwise direction and is maintained in stopped state by one end 20 of the hooking lever 6 due to their engagement.

On the other hand, the blade opening member 34 (FIGS. 13, 14) forcibly rotates the lever 13a in the direction of the arrow b in FIG. 2 to bring said lever 13 to the position shown in FIG. 2B, whereby the shutter blade ring 10 is brought, through the lever 13, to the limit of clockwise rotation and the shutter blades are maintained at fully opened states.

Figure 3:
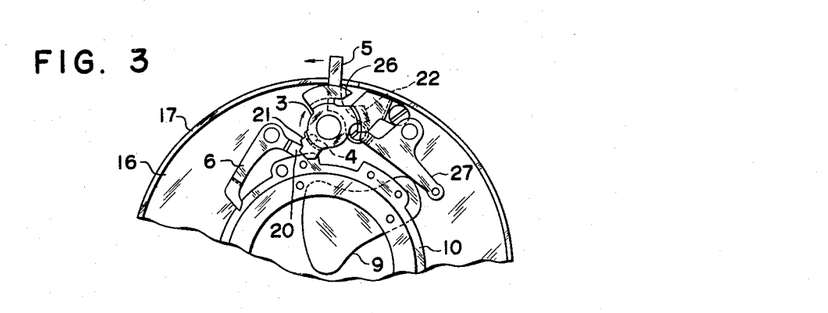
FIGS. 3 and 4 are partial, front elevational views for describing the signal generating device which is connected to the main operating member of the shutter of the invention, showing different conditions in the operation thereof.

Upon release of the camera, at first, the first release lever 14 (in FIG. 2A) is rotated toward arrow a around the pivotal shaft 15, whereby the blade opening member 34 (FIGS. 13, 14) is released, this operation is not shown particularly in the drawing) and locking of the member 13a (FIG. 2B) is released. Since the shutter blade ring 10 has a tendency to be rotated counterclockwise around the optical axis due to a spring (not shown), upon release of the member 13a the various parts of the shutter are brought from the states of FIG. 2B to that of FIG. 2A. FIGS. 3 and 15 are similar states. The blade opening member 34 continues to operate, the diaphragm, mirror, and film cover plate are successively (as described below) rotated, and at its last process, the second release lever 8 is rotated in the counterclockwise direction (arrow f in FIG. 2A) around the shaft 8', thus releasing the cocking member 1.

In FIG. 2A, the cocking member 1 is provided with a spring for rotating said member 1 in the counterclockwise direction, although it is not shown, so that said member 1 is made to rotate toward arrow d (in FIG. 2A) upon release of the shutter and rotates, at its last process, the lever 6 in the clockwise direction around its pivotal shaft, whereby the one end 20 of the lever 6 is released from the protrusion 21 of the main operating member 3. As already described, since a strong driving force for rotating the main operating member 3 in the clockwise direction is stored in said member 3, this member is made to rotate in the direction of arrow e (in FIG. 2A), whereby its protrusion 22 pushes the shutter blade operating lever 23, thus rotating said lever 23 around its pivotal shaft in the counterclockwise direction. Since one end of the lever 23 is in contact with the shutter blade opening pin 24 fixed on the shutter blade ring 10, the shutter blade ring 10 is rotated clockwise, through the pin 24, by counterclockwise rotation of the lever 23, whereby the shutter blade 9 is brought in its fully opened state (FIG. 2C) through the pin 11.

The member 3 continues its movement and in the course of said movement the lug 26 of said member 3 pushes the lever 27 of the shutter speed adjusting governor the operation of which is omitted herein because it has no direct relation to the present invention, whereby the lever 27 is made to rotate counterclockwise around its pivotal shaft 27'. The shutter blade maintains its fully opened state during the period of time in which the member 3 pushes the lever 27. By varying said period of time by means of the said governor the shutter speed is made to be variable.

Figure 2C:
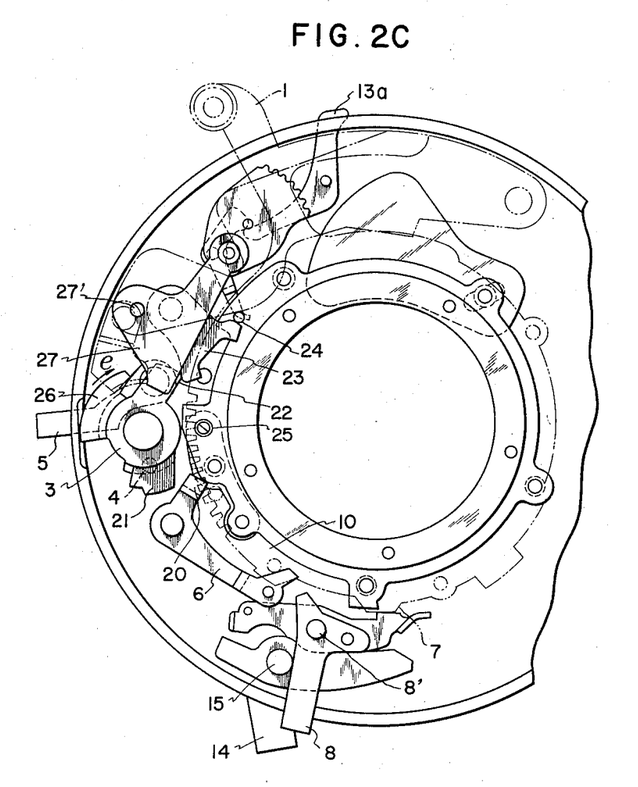

In FIG. 2C, even when the lever 27 has been pushed until its last process by the member 3, this member 3 continues its clockwise rotation, thus pushing the shutter blade closing pin 25 through protrusion 22 of said member and rotating the shutter blade ring 10 in the counterclockwise direction, whereby the shutter blade 9 is maintained in its closed state through the pin 11.

Figure 4:
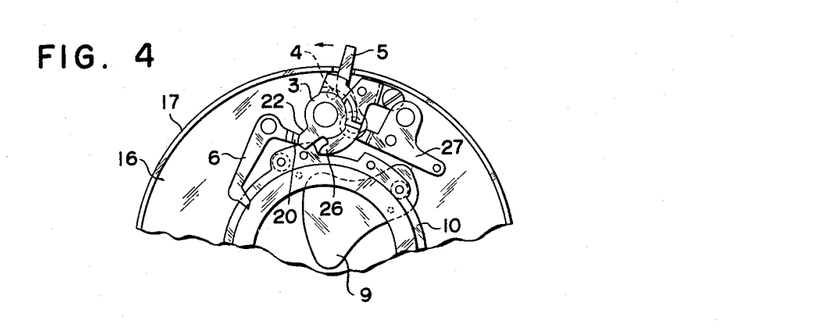

According to the above-mentioned movements of the member, light rays of the necessary amount are projected upon film surface and the photographing is completed. However, the main operating member 3 continues its movement and at the last process of said movement the pin 4 fixed to the member 3, as shown in FIG. 4, pushes the signal lever 5 to make said lever 5 rotate around its pivotal shaft in the clockwise direction and then it is stopped by a stopper shown by chain line in FIG. 16.

Figure 16:
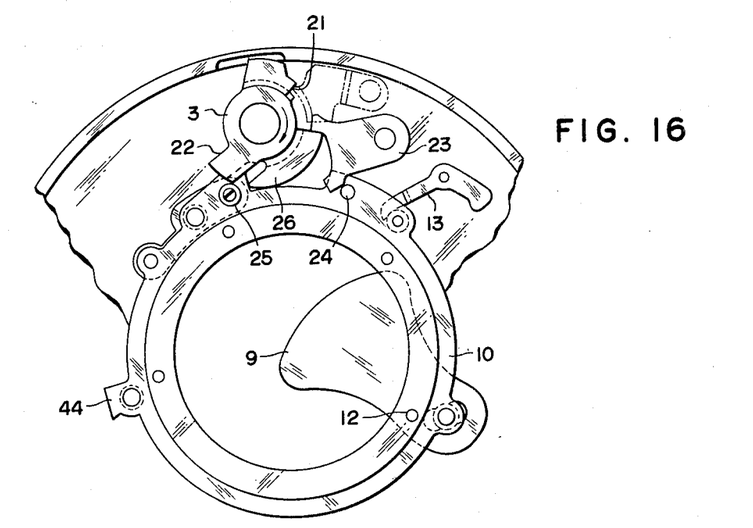
FIG. 16 shows the condition when the exposure operation has been completed.

In the conventional shutter, it is so constructed that a member corresponding to the protrusion 22 of the member 3 locks a member corresponding to the pin 25, whereby the blade ring 10 is locked. Accordingly, in this state, it is impossible to bring again the shutter blade in opened state. However, in the shutter of this invention the member 3 moves up to the position such as shown in FIG. 16 and does not prevent the rotation (movement from FIG. 16 to FIG. 17) of the pin 25 around the optical axis because the pin 25 is brought downwardly so as to make the protrusion 22 pass over it, so that it is possible to bring the shutter blade into the opened state (FIG. 17) by rotating the ring 10.

Figure 5:
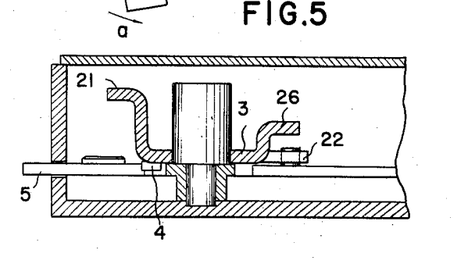
FIG. 5 is a partial, side elevational view corresponding to FIGS. 3 and 4.

In the above-described mechanism, since the signal lever 5 is rotated upon completion of the operation of the main operating member 3, it is possible for the said mechanism to generate its signal without being influenced at all by the length of the exposure time. A side view of FIG. 4 is shown in FIG. 5.

Figure 13:
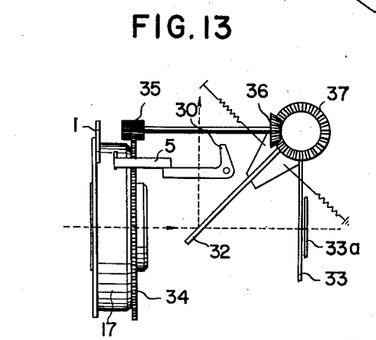
FIGS. 13 and 14 are side elevational views of the signal generating device, mirror, and film cover plate of one embodiment of the invention, showing the mutual relationship between the said elements for two different positions of operation.
Figure 14:
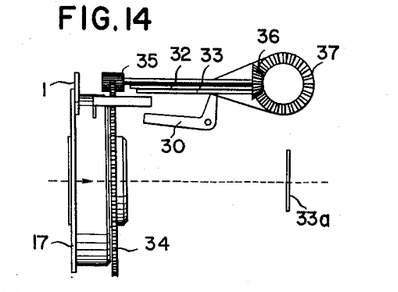
Figure 15:
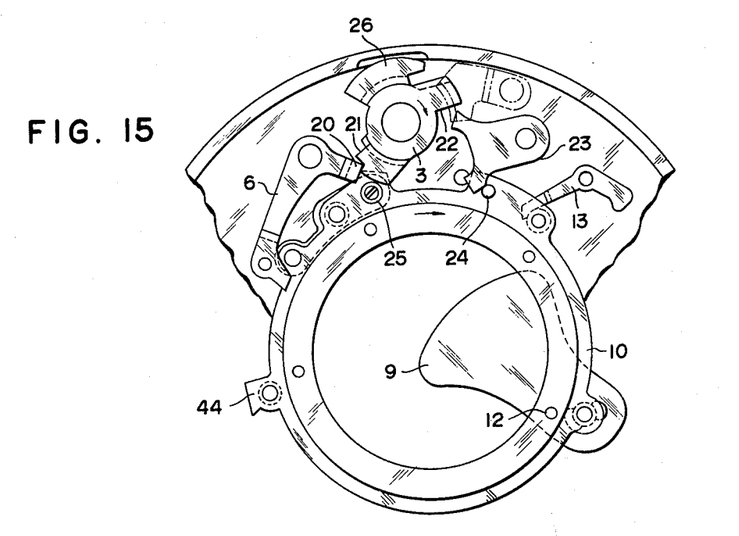
FIG. 15 shows the condition when the main operating member has been cocked, and the shutter blades are closed.
Figure 17:
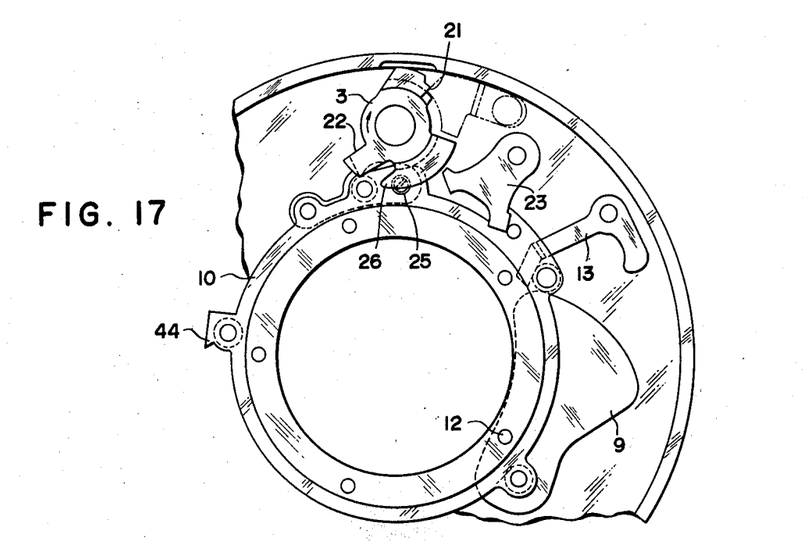
FIG. 17 shows the subsequent condition when the shutter blades have been opened again.

By this signal a returning motion is exerted on the blade opening member 34, as will be more particularly understood from FIGS. 13 and 14, whereby the member 34 is made to operate in the reverse direction, thus causing the mirror and film cover plate to exert their reverse directional operations. In such a manner, at last the shutter blades are again brought into their full opening states. This condition is shown in FIG. 17.

Figure 6:
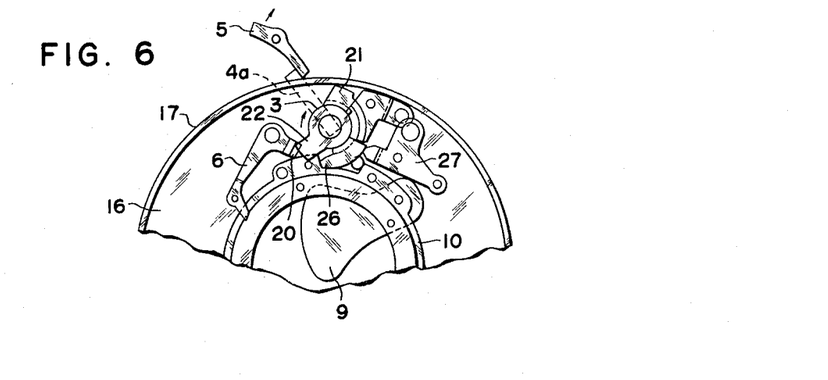
FIGS. 6 and 7 are, respectively, a partial front elevational view and a partial side elevational view showing another embodiment of the signal generating device of the present invention.
Figure 7:
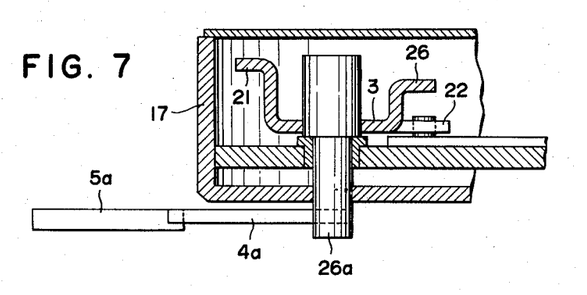
Figure 8:
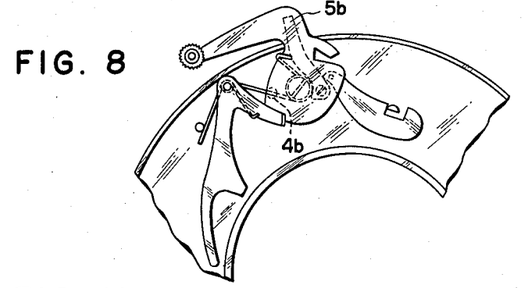
FIGS. 8 and 9 are, respectively, a partial front elevational view and a partial side elevational view in section showing still another embodiment of the signal generating device of the invention.
Figure 9:
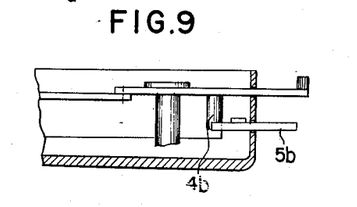

Another embodiment of the signal generating device, representing the case wherein the signal lever is installed outside of the shutter, for example, in such positions as on the camera body is shown in FIGS. 6 and 7. In this embodiment the shaft 26a of the main operating member 3 is extended to the rear of the shutter, and an arm 4a which is fixed to said shaft 26a is engaged with a signal lever 5a installed outside of the shutter. FIGS. 8 and 9 illustrate a further embodiment wherein the above-described feature has been applied to a shutter of the pronter type. In this embodiment, a pin 4b engages with a signal lever 5b.

Figures 10, 11:
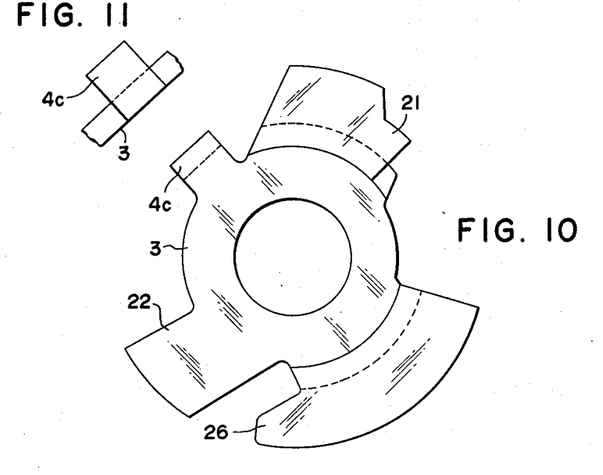
FIGS. 10, 11 and 12 are elevational views of modifications of the main operating member of the embodiment.
Figure 12:
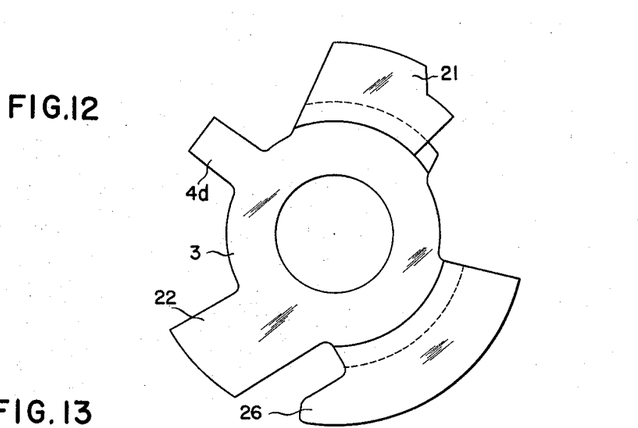

FIGS. 10, 11 and 12 illustrate further modifications of the signal protrusions 4c and 4d provided on the main operating member.

One embodiment of the signal generating device in combination with a mirror and film cover plate and their mutual relationships are illustrated in FIGS. 13 and 14. In FIG. 13, the signal lever 5 is holding down a mirror hooking lever 30, and a mirror 32 and a film cover plate 33 are lowered, whereby the film 33a is prevented from becoming exposed.

On the other hand, when the blade opening member 34 is cocked, the shutter blades and aperture diaphragm are opened, and the shutter is in a condition permitting focus adjustment. The blade opening member 34 is connected to the mirror 32 and film cover plate 33 through a pinion 35 and bevel gears 36 and 37, so that, when the shutter blades are opened, the mirror 32 and film cover plate 33 are caused to descend. Conversely, when the blade opening member 34 is released, and the shutter blades are closed, the mirror 32 and film cover plate 33 are caused to ascend.

When the main operating member of the shutter is cocked, the signal lever 5 is caused to rise as indicated in FIG. 14 and the mirror hooking lever 30 is in a free condition. Thereafter, when the first release lever 14 is released, the blade opening member 34 temporarily closes the shutter blades and also stops down the aperture diaphragm to the preset aperture. In response to the above-described action, the mirror and film cover plate 32 ascend, and the main operating member 3 of the shutter is released. The condition immediately prior to this action is shown in FIG. 14. When the main operating member 3 has completed the exposure operation and lowers the signal lever 5, the mechanical condition returns to that shown in FIG. 13.

Figure 2D:
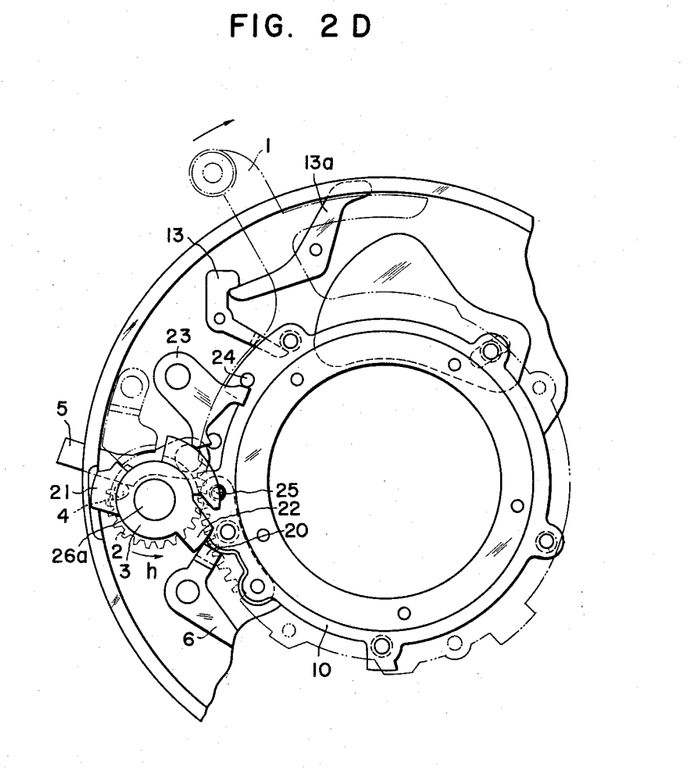
Figure 18:
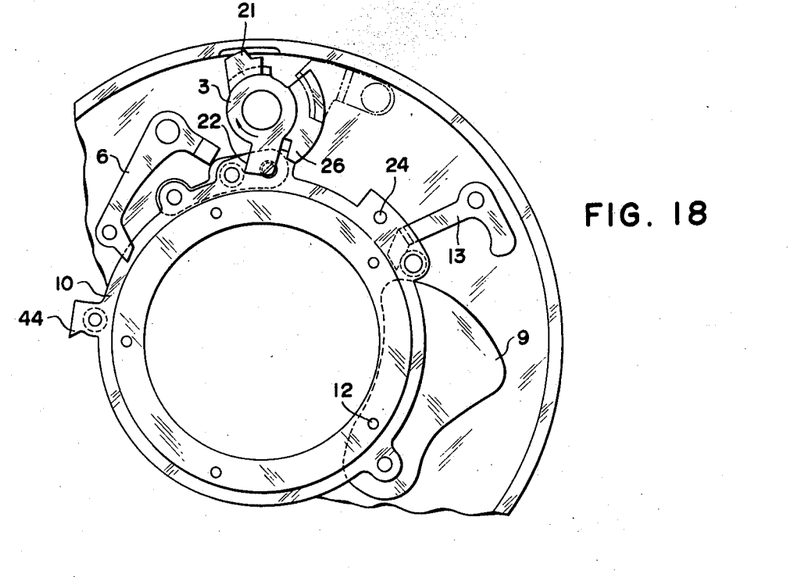
FIG. 18 shows the condition wherein the main operating member is cocked with the shutter blades maintained in their opened condition.
Figure 19:
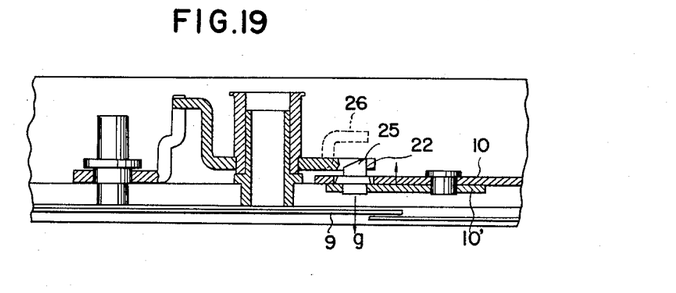
FIG. 19 is a partial side view corresponding to FIG. 18.

At the moment just prior to shutter cocking, all parts take the positions as shown in FIG. 2A. When the cocking lever 1 is cocked in the clockwise direction around the optical axis, a set gear 2 (FIGS. 1 and 2D) which is geared with said cocking lever 1 rotates in the counterclockwise direction around a shaft 26a. Since the set gear 2 is provided with a part which accompanies the main operating member 3 only when said set gear 2 rotates in the counterclockwise direction, the member 3 also rotates, in the counterclockwise direction such as shown by arrow *h* (FIG. 2D), together with the rotation of the lever 1. In FIG. 17 and FIG. 2D, when the member 3 is rotated in the direction of arrow *h*, the protrusion 22 collides with the blade closing pin 25. However, as shown in FIG. 19, the pin 25 is mounted on a leaf spring 10′ attached to the blade ring 10 so as to be deflected downward owing to resiliency thereof and the upper surface of the pin 25 is sloped as shown in the drawing to act as a cam surface. Consequently, when the protrusion 22 collides with said sloped surface, the pin 25 is depressed in the direction of the arrow *g*, whereby the protrusion 22 passes over said pin, as shown in FIG. 18. However, as described already, exposure is executed (as shown in FIG. 2C) after the shutter release, so that when the protrusion 22 collides with the pin 25 due to clockwise rotation of the member 3, the protrusion 22 does not contact the sloped surface of the pin 25 because the protrusion 22 collides with the side surface of the pin 25. Consequently, the pin 25 is not exerted to be depressed downwardly and forced in accordance with the rotation of the protrusion 22 to rotate the blade ring 10 in the counterclockwise direction, whereby the shutter blade is closed.

This condition is shown in FIG. 16. When the blade opening member 34 is cocked, the lever 13 which is connected to said member moves the shutter blade ring in the direction for opening, and the device assumes the condition shown in FIG. 17. In FIG. 18 is shown the condition wherein, with the shutter blades maintained in their opened positions as shown in FIG. 17, the main operating member 3 is being cocked.

Figure 20:
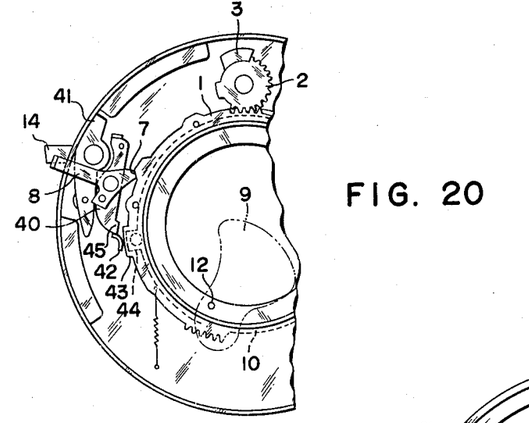
FIG. 20 shows the action of the release lever when the main operating member is in the cocked condition.
Figures 21, 22:
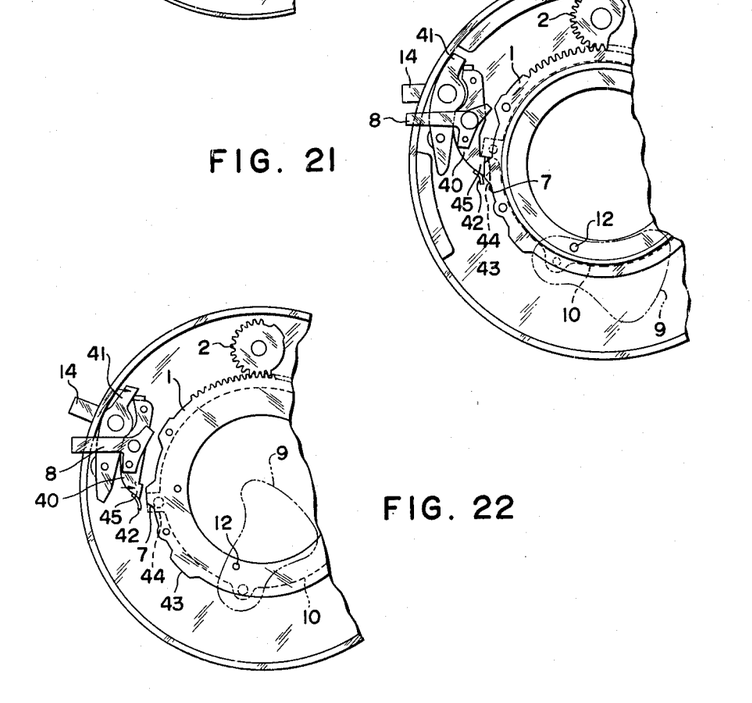
FIG. 21 shows the condition wherein the bulb operating lever is acting after release.
FIG. 22 shows the condition of the release lever when the exposure operation has been completed.

The release lever mechanism may be described as following in connection with FIGS. 20, 21 and 22. FIG. 20 shows the relative positions of the first release lever 14 and the second release lever 8 in the same condition as that shown in FIGS. 1 and 2. FIG. 21 illustrates the condition wherein the ascending motion of the mirror or the film cover plate from the condition of FIG. 20 is utilized or the return motion of the blade opening member 34 shown in FIGS. 13 and 14 is utilized to release the second release lever 8, release the cocking member 1, and make the exposure opening action of the main operating member commence, whereby the shutter blades are fully opened. FIG. 22 illustrates the condition wherein the exposure operation has been completed, and the shutter blades are closed.

By the above-described construction, the operational sequence of a shutter for a single-lens reflex camera can be accomplished positively and precisely. That is, since the main operating member is released only after the shutter blades, which have been opened for focus adjustment, are securely closed again, the shutter blades cannot be opened by accident. Furthermore, the bulb operating lever 40 is engaged with and actuated by a connecting lever 41 which is on the same shaft and undergoes the same motion as that of the first release lever 14. The bulb operating lever 40 is actuated by a spring tending to rotate said lever 40 in the counterclockwise direction, but, in the condition shown in FIGS. 1 and 2, a tip 42 is in engagement with a protrusion 43 of the cocking member 1, whereby said lever 40 is prevented from any further rotation in the counterclockwise direction. Therefore, even when the shutter blade ring 10 is rotated in the direction for opening the shutter blades 9, the bulb protrusion 44 of the said ring does not engage with the catch 45 of the bulb operating lever.

When the second release lever 8 is operated, and the cocking member 1 is rotated as afore-described, the protrusion 43 is disengaged from the tip 42; consequently the bulb operating lever 40 becomes capable of freely rotating counterclockwise.

When a speed adjusting cam (not shown) assumes the bulb position, it is hooked onto the shutter blade ring, and the shutter blades can be opened. When said speed adjusting cam is in a position other than the bulb position, said cam clocks the rotation of the bulb operating lever 40, just as in the conventional shutters.

The construction of the bulb operating lever as described above has the unique feature that, by its use, the bulb operation of a shutter for a single-lens reflex camera can be accomplished positively.

By the use of the mechanical arrangement shown in FIGS. 3 through 14, a quick-return type, single-lens reflex camera is made easily and positively operable because of the simple, yet low-price, construction.

According to use of the mechanical arrangement shown in FIGS. 15 through 20, since the protruding arm of the shutter blade operating device (main operating member) passes through the pin on the shutter blade ring at the time of closing the shutter blade and the blade closing pin of the shutter blade ring is retractable downwardly when the main operating member is cocked, the cocking mechanism is simple; the operation is positive; and it is possible always for the shutter blade ring to rotate the shutter blades in the opening direction independently of the sequential instant before or after the cocking of the shutter. Therefore, a lens shutter for quick-return type, single-lens reflex cameras, wherein visual observation of the depth of focus, or depth of field, is possible whenever necessary, is obtainable.

By the use of the mechanical arrangement shown in FIGS. 20, 21 and 22, it is possible to achieve positive bulb action of a lens shutter for single-lens reflex cameras. Furthermore, in shutters of this type, the sequence of the operations of the shutter, the mirror, and the film cover plate, which is important, is solved by providing two release levers, one release lever being operated first, the other release lever being so linked and arranged as to be released by the motion of the mirror or the film cover plate, and the first release lever being made to effect the bulb action, whereby the chain-reaction-line operation of a single-lens reflex camera can be made positive.

Since it is obvious that many changes and modifications can be made in the above described details without departing from the nature and spirit of the invention, it is to be understood that the invention is not to be limited to the details described herein except as set forth in the appended claims.

What I claim is:

1. A shutter for single-lens reflex cameras having an exposure opening which comprises a plurality of shutter blades adapted to open and close said exposure opening, a shutter blade ring mounted for rotation about the optical axis of the lens to operate said shutter blades, said shutter blade ring having two pins one of which is fixed thereon and acts as an opening pin to actuate said ring in the direction for opening said shutter blades and second of which is provided with an end surface sloped in one direction to form a cam adapted to deflect said pin axially, said second pin constituting a closing pin to actuate said ring in the direction for closing said shutter blades at its normal position, a main operating member which has a center of rotation other than the optical axis, and a power source to drive said shutter blade ring to cause said shutter blade ring to open and close, whereby the primary exposure operation of the shutter is accomplished, said main operating member including an engagement part for engaging said shutter blade ring, means for bringing said engagement part to the position outside the path of movement of said closing pin after complete closing of said shutter blades, whereby the shutter blade ring is made to be rotatable in the direction for opening the shutter blades so that the shutter blades may be reopened immediately after completion of the exposure without cocking the shutter and so that, when said shutter blade ring is in the position in which said shutter blades are fully opened upon rotating said main operating member in the opposite direction to cock the shutter, said closing pin is within the path of movement of said engagement part of said main operating member, said engagement part engaging said sloped end surface of said second pin so that it is depressed downwardly by said engagement part, whereby said second pin permits rotation of said main operating member to enable the shutter to be cocked.

2. A lens shutter according to claim 1, comprising a signal engagement part mounted for movement with the main operating member, and a signal lever which is actuated by said signal engagement part at the time of closing the shutter blades upon completion of the primary exposure operation of the shutter whereby completion of the exposure is indicated.

3. The lens shutter of claim 2, in which said single lens reflex camera includes a mirror means which extends between the lens and the film except during exposure, said mirror means being provided with a release mechanism actuated by said signal lever upon completion of the exposure whereby said mirror means is made to return to its position between the lens and the film.

References Cited by the Examiner

UNITED STATES PATENTS

| | | | |
|---|---|---|---|
| 2,815,702 | 12/57 | Weise | 95—63 |
| 2,862,431 | 12/58 | Noack | 95—63 |
| 2,890,640 | 6/59 | Noack | 95—63 |
| 3,136,234 | 6/64 | Singer | 95—63 |

NORTON ANSHER, *Primary Examiner.*

JOHN M. HORAN, *Examiner.*